J. H. BRIZENDIN.
RESILIENT WHEEL.
APPLICATION FILED NOV. 4, 1912.
1,090,834.
Patented Mar. 24, 1914.
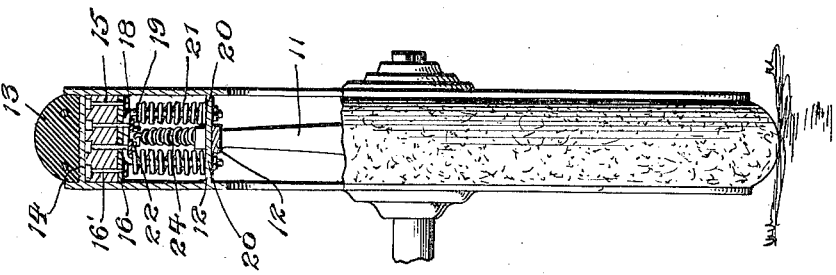
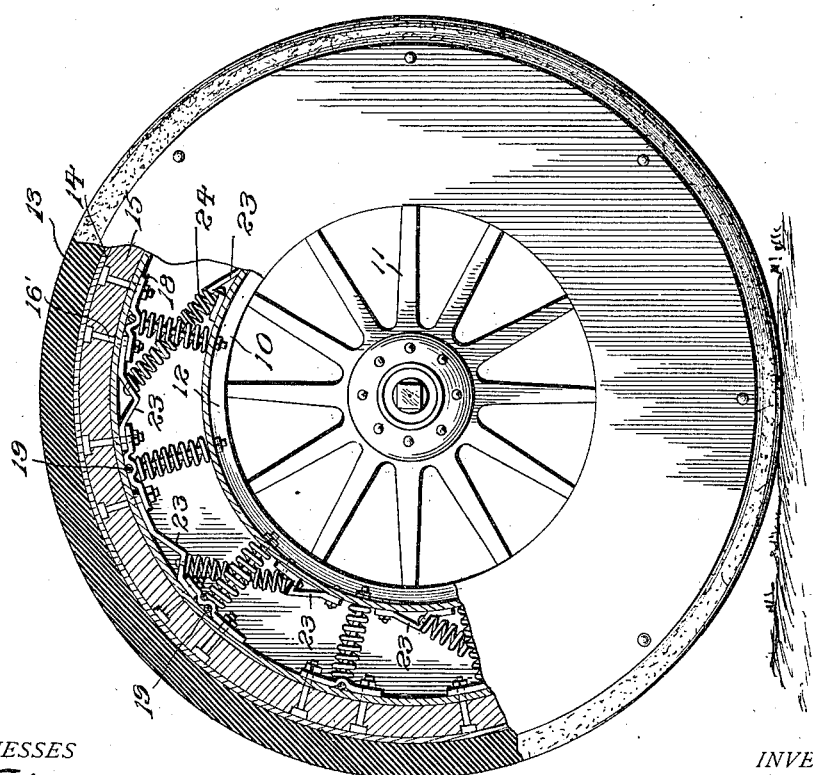
WITNESSES
INVENTOR
J. H. Brizendin
Attorneys.

UNITED STATES PATENT OFFICE.

JOHN H. BRIZENDIN, OF LEES SUMMIT, MISSOURI.

RESILIENT WHEEL.

1,090,834.  Specification of Letters Patent.  Patented Mar. 24, 1914.

Application filed November 4, 1912. Serial No. 729,428.

*To all whom it may concern:*

Be it known that I, JOHN H. BRIZENDIN, citizen of the United States, residing at Lees Summit, in the county of Jackson and State of Missouri, have invented certain new and useful Improvements in Resilient Wheels, of which the following is a specification.

This invention relates to an improvement in resilient wheels.

The primary object of the invention is to provide a wheel for motor vehicles which will have the same resiliency as a pneumatic tired wheel.

A further object of the invention is to provide a construction in which the hub of the wheel is cushioned by means of springs, the springs being so arranged as to take up rotary movement of the outer rim with respect to the inner rim as well as cushion its radial movement.

In the drawings: Figure 1 is a side elevation partly in section; Fig. 2 is an end elevation partly in section.

In the drawings 10 designates the inner rim which is supported by the spokes 11. A metallic band 12 is supported by the inner rim, said band being of greater width than the rim, the edges of the band extending beyond the edges of the rim, the edges being perforated at intervals. The tread 13 is supported on the outer rim 14 which is bolted to the felly 15, a band 16 being secured to the under face of the felly. Bolts 16' pass through the felly and hold the rim and band on the same. The rim is provided with flanges 17 which embrace the felly and the band 12. Brackets 18 are bolted to the band 16 at intervals, each of the brackets supporting a U-shaped member 19 the terminals 20 of which project through the band 12, the openings in the band being sufficiently large to allow for the free movement of said terminals. A coil spring 21 embraces each of the vertically extending portions of the U-shaped member 19, the upper terminal of said spring contacting with the transverse portion 22 of the U-shaped member and the lower terminal contacting with the band 12. It will be noted by this construction that the outer rim is free to move with respect to the inner rim, being cushioned in its movement by the coil springs 21. Brackets 23 are placed at intervals on the band 16 and the band 12, the brackets of the band 16 being disposed in staggered relation with respect to the brackets on the band 12. These brackets are substantially V-shaped and are provided with off-set portions which are bolted to the bands. The obliquely disposed coiled springs 24 connect the brackets of the outer band with the adjacent brackets of the inner band. By this construction it will be seen that any tendency of the outer rim to revolve with respect to the inner rim will be taken up by the springs 24, the U-shaped members having a slight pivotal connection with the outer band which permits of a pivotal movement with respect to the outer rim.

The many advantages of a construction of this character will be clearly apparent as it will be noted that the hub is not only cushioned for the radial movement of the outer rim but that any tendency of the outer rim to revolve with respect to the hub will be taken up by the obliquely disposed springs. It will also be seen that the entire construction is such as may be easily and economically manufactured and that the various parts may be readily assembled.

Having described the invention, what I claim is:

A resilient wheel comprising spaced inner and outer rims, means hingedly supported by the outer rim, said means being formed with extensions the terminals of which project through the inner rim, springs embracing said extensions and interposed between the rims, and other springs connecting the inner and outer rims and projecting between certain of said extensions.

In testimony whereof I affix my signature in presence of two witnesses.

JOHN H. BRIZENDIN. [L. S.]

Witnesses:
 JOHN A. KERR,
 GEO. W. ST. CLAIR.